3,148,223
PERFLUOROALLENE
Thomas L. Jacobs, Los Angeles, and Ronald S. Bauer, South Gate, Calif., assignors to E. I. du Pont de Nemours and Company, Wilmington, Del., a corporation of Delaware
No Drawing. Filed July 11, 1957, Ser. No. 671,131
3 Claims. (Cl. 260—653.5)

The present invention relates to novel fluorinated compounds, and more particularly to a novel perfluorinated diene and polymeric products derived therefrom.

Terminally unsaturated fluorinated olefins, and particularly fluorinated ethylenes, have been found to be highly useful as monomers in the preparation of fluorinated polymers with outstanding properties. Thus tetrafluoroethylene has been polymerized to a polymer having outstanding corrosion resistance, dielectric properties, heat and light stability and toughness. The use of fluorinated diolefins in the preparation of polymeric material has not been widely investigated primarily because of the difficulties encountered in the preparation of such diolefins.

It is therefore the object of the present invention to provide a novel fluorinated diene useful in the formation of polymeric materials. It is a further object of the present invention to provide novel perfluorodiene polymers. It is yet another object of the present invention to provide a method for preparing the novel fluorodiene of the present invention. Other objects will become apparent hereinafter.

In accordance with the present invention, a novel perfluorinated diene having the formula $C_3F_4$, the structure $F_2C=C=CF_2$, and a boiling point at $-38\pm0.5°$ C. has been prepared. It was discovered that the said perfluorodiene is an extremely active monomer which is capable of being polymerized to highly useful unsaturated polymeric products.

The perfluorodiene of the present invention is prepared by a process which comprises reacting a compound of the class consisting of 3-bromo-1,1,3,3-tetrafluoropropene and 1,3-dibromo-1,1,3,3-tetrafluoropropane with a dry alkali metal hydroxide, and recovering a perfluoroallene in accordance with the following equations:

$$CF_2=CH-CF_2Br+KOH \rightarrow CF_2=C=CF_2+KBr+H_2O$$
$$CF_2Br-CH_2-CF_2Br+2KOH \rightarrow CF_2=C=CF_2+2KBr+2H_2O$$

The 1,3-dibromo-1,1,3,3-tetrafluoropropane may be prepared by the reaction of 1,1-difluoroethylene with dibromodifluoromethane. The preferred starting material, however, is 3-bromo-1,1,3,3-tetrafluoropropene which may be prepared from the 1,3-dibromo-1,1,3,3-tetrafluoropropane by reaction with potassium hydroxide. The preparation of the starting materials is known in the prior art and is for that reason not further discussed. Of the alkali metal hydroxides, the potassium hydroxide is preferred by reason of its greater reactivity.

The process is generally carried out at room or slightly elevated temperatures. The reaction product is formed when the reagents are combined in bulk or admixed in the presence of an inert solvent. The reaction may further be carried out by contacting the halogenated propane or propene in gaseous form with the solid hydroxide, which if desired, can be on an inert support. The alkali metal hydroxide need not be of extreme purity, but the reaction is carried out preferably in the absence of moisture. Solvents suitable in the process of the present invention are hydrocarbons and ethers which are liquid at reaction conditions.

The $C_3F_4$-diene prepared in accordance with the present invention is believed to be perfluoroallene. Although this structure has been assigned to a compound boiling at $-28°$ C. it is believed that the assignment was erroneous in that it was found that perfluoroallene prepared by the process of the present invention has a boiling point of $-38\pm0.5°$ C. and in view of the analysis described below corresponds to the allene structure. No perfluoroallene, having a boiling point at $-38°$ C. was formed in the products obtained by the method disclosed for the preparation of tetrafluoroallene B.P. $-28°$ C.

Perfluoroallene is readily polymerized to a polymeric material which is believed to have the structure

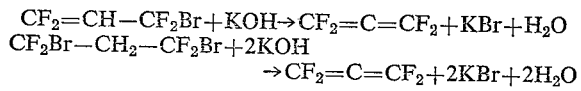

The monomer is sufficiently reactive to polymerize in the gas phase in the absence of added catalyst at room temperature and low pressures. However, polymerization of the monomer under conditions more conducive to high molecular weight polymer formation may readily be carried out. Thus polymerization of perfluoroallene in the presence of an aqueous medium, a free radical catalyst such as a peroxide, temperatures above room temperatures, and elevated pressure is feasible.

The present invention is further illustrated by the following examples:

*Example I*

Into a 250 ml. flask equipped with an addition funnel, a stainless steel stirrer and a reflux condenser cooled with ice water and vented through a Dry Ice trap protected from the atmosphere by a calcium chloride tube, was charged 200 g. of dry powdered potassium hydroxide. The powdered potassium hydroxide was agitated by the stirrer and 16.5 g. (0.085 mole) of 3-bromo-1,1,3,3-tetrafluoropropene was slowly added. The reaction mixture was heated by a steam bath. The potassium hydroxide melted and vigorous refluxing of the reaction mixture occurred. The gentle heating was continued until no further refluxing occurred. The material in the Dry-Ice trap was distilled. Approximately 1 g. of a material boiling at $-38\pm0.1°$ C. was collected and analyzed. This corresponded to the yield of 11%.

*Analysis.*—Calcd. for $C_3F_4$: C, 32.16; molecular weight 112.0. Found: C, 31.80; molecular weight (vapor density) 114.

The infrared spectrum of this compound was characterized by a strong band at 2065 cm.$^{-1}$.

Addition of chlorine to perfluoroallene resulted in the formation of 1,2,2,3-tetrachloro-1,1,3,3-tetrafluoropropane, as shown by comparison of boiling point, refractive index and infrared spectrum with a separately prepared authenic sample of 1,2,2,3-tetrachloro-1,1,3,3-tetrafluoropropane.

*Example II*

A tube, 20 mm. in diameter, 127 mm. long, was packed with 20–30 mesh ascarite. 3-bromo-1,1,3,3-tetrafluoropropene suspended in a stream of nitrogen was passed through the tube maintained at room temperature. The reaction products were then passed into a Dry Ice trap. Perfluoroallene B.P. $-38°$ C. was obtained on distilling the reaction products.

The experiment was repeated employing 1,3-dibromo-1,1,3,3-tetrafluoropropane. On distilling the reaction products perfluoroallene B.P. $-83°$ C. was obtained.

*Example III*

A 1.5 g. sample of perfluoroallene B.P. 38° C. was placed into a 12 mm. diameter, 130 mm. long tube which was sealed and then warmed to room temperature. On standing overnight at room temperature a white polymeric powder weighing about 0.91 g. was obtained. The polymer was found to have a melting point of about 125–126° C. The X-ray diffraction pattern of the polymer was in accord with the structure:

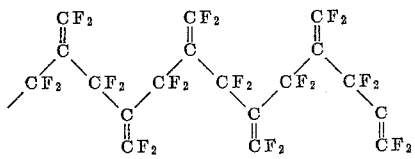

The infrared spectrum showed strong absorption at 1715, 1343, 1196, 1072 and 1020 cm.$^{-1}$. The 1715 cm.$^{-1}$ band is believed to be characteristic of vinylidene fluoride unsaturation and characteristic of the polyperfluoroallene having the above identified structure.

Perfluoroallene, prepared by the process of the present invention may be, as illustrated by the examples, employed in the preparation of solid polymers. Due to the residual unsaturation of the polymer polyperfluoroallene is highly useful in the preparation of cross-linked elastomeric polymers of outstanding heat and corrosion resistance. Perfluoroallene may further be employed in the preparation of copolymers with monoolefins having terminal unsaturation and particularly in the preparation of copolymers with fluorinated ethylene such as tetrafluoroethylene.

We claim:
1. A process for preparing perfluoroallene, B.P. −38° C., consisting essentially of reacting a compound of the class consisting of 3-bromo-1,1,3,3-tetrafluoropropene and 1,3-dibromo-1,1,3,3-tetrafluoropropane with a dry alkali metal hydroxide.
2. The process as set forth in claim 1 wherein the alkali metal hydroxide is potassium hydroxide.
3. The process of claim 1 wherein sodium hydroxide is contacted with 3,bromo-1,1,3,3-tetrafluoropropene.

References Cited in the file of this patent
UNITED STATES PATENTS

| | | |
|---|---|---|
| 2,668,182 | Miller | Feb. 2, 1954 |
| 2,729,613 | Miller | Jan. 3, 1956 |

OTHER REFERENCES

Fieser et al.: "Organic Chemistry," 3rd Edition, Reinhold Pub. Corp., New York, 1956.

Brewster: "Organic Chemistry," 2nd Edition (1953) Prentice-Hall Inc., New York, page 64.